(12) United States Patent
Kanemoto et al.

(10) Patent No.: US 11,245,466 B2
(45) Date of Patent: Feb. 8, 2022

(54) BASE STATION DEVICE, COMMUNICATION SYSTEM AND COMMUNICATION CONTROL METHOD

(71) Applicant: PANASONIC INTELLECTUAL PROPERTY MANAGEMENT CO., LTD., Osaka (JP)

(72) Inventors: Hideki Kanemoto, Kanagawa (JP); Takeshi Yasunaga, Kanagawa (JP); Ritsu Miura, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 2 days.

(21) Appl. No.: 16/753,109

(22) PCT Filed: Sep. 11, 2018

(86) PCT No.: PCT/JP2018/033700
§ 371 (c)(1),
(2) Date: Apr. 2, 2020

(87) PCT Pub. No.: WO2019/069644
PCT Pub. Date: Apr. 11, 2019

(65) Prior Publication Data
US 2020/0287618 A1    Sep. 10, 2020

(30) Foreign Application Priority Data

Oct. 4, 2017  (JP) .............................. JP2017-194136

(51) Int. Cl.
*H04B 7/185* (2006.01)
*H04W 4/90* (2018.01)
(Continued)

(52) U.S. Cl.
CPC ....... *H04B 7/18506* (2013.01); *H04B 7/0608* (2013.01); *H04W 4/40* (2018.02); *H04W 4/90* (2018.02); *H04W 72/046* (2013.01)

(58) Field of Classification Search
CPC ... H04B 7/18506; H04B 7/0608; H04W 4/90; H04W 4/40; H04W 72/046
See application file for complete search history.

(56) References Cited

U.S. PATENT DOCUMENTS 5,557,656 A    9/1996  Ray et al.
6,108,539 A *  8/2000  Ray .................... H04B 7/18506
                                              455/427
(Continued)

FOREIGN PATENT DOCUMENTS

JP    2001-522160    11/2001
JP    2017-505567    2/2017
(Continued)

OTHER PUBLICATIONS

Extended search report dated Oct. 22, 2020 issued in European patent application No. 18865010.5-1212.
(Continued)

*Primary Examiner* — Eric Myers
(74) *Attorney, Agent, or Firm* — Greenblum & Bernstein, P.L.C.

(57) ABSTRACT

According to the present application, a base station device is configured to manage a vertically-oriented cell and a ground cell with respective IDs used to identify each cell, to determine whether or not a counterpart terminal device is an aircraft terminal device for air-to-ground communication based on a terminal ID included in a message received therefrom, and to control communication with the counterpart terminal device such that, if the counterpart terminal device is an aircraft terminal device, the base station selects the vertically-oriented cell as a connection destination of the
(Continued)

counterpart terminal device and transmits a connection instruction message including a cell ID of the vertically-oriented cell to the counterpart terminal device, otherwise, the base station selects the ground cell as a connection destination of the counterpart terminal device and transmits a connection instruction message including a cell ID of the ground cell to the counterpart terminal device.

6 Claims, 8 Drawing Sheets

(51) Int. Cl.
*H04W 4/40* (2018.01)
*H04B 7/06* (2006.01)
*H04W 72/04* (2009.01)

(56) References Cited

U.S. PATENT DOCUMENTS

| | | | |
|---|---|---|---|
| 9,991,945 | B2 | 6/2018 | Hommel et al. |
| 2012/0244850 | A1* | 9/2012 | Doherty ............... H04W 4/48 |
| | | | 455/418 |
| 2015/0163848 | A1 | 6/2015 | Lin et al. |
| 2017/0155442 | A1 | 6/2017 | Hommel et al. |

FOREIGN PATENT DOCUMENTS

| | | |
|---|---|---|
| JP | 2017-523742 | 8/2017 |
| WO | 99/22465 | 5/1999 |

OTHER PUBLICATIONS

International Search Report issued in International Pat. Appl. No. PCT/JP2018/033700, dated Oct. 23, 2018.

* cited by examiner

BASE STATION DEVICE, COMMUNICATION SYSTEM AND COMMUNICATION CONTROL METHOD

TECHNICAL FIELD

The present invention relates to a base station device for performing air-to-ground communication with a terminal device for air-to-ground communication placed in an aircraft (aircraft terminal device) and for performing ground-to-ground communication with a terminal device placed on a ground location (ground terminal device), a communication system comprising a base station device for performing air-to-ground communication with an aircraft terminal device placed in an aircraft and for performing ground-to-ground communication with a ground terminal device placed on a ground location, and a communication control method performed by a base station device for controlling communication with an aircraft terminal device placed in an aircraft and a ground terminal device placed on a ground location, with regard to a connection destination thereof.

BACKGROUND ART

In recent years, in-flight Internet services have been widely available, which enable user terminals carried by aircraft passengers to be connected to the Internet in aircrafts. Such an in-flight Internet service is realized by an air-to-ground communication system in which a terminal for air-to-ground communication placed in an aircraft (aircraft terminal) can perform air-to-ground communications with base stations on the ground.

Since installing a new base station dedicated to air-to-ground communication is costly, an air-to-ground communication system is preferably built by additionally providing a vertically-oriented antenna adapted for air-to-ground communication to an existing ground communication base station for ground-to-ground communication. However, such a configuration involves a problem that, in some cases, an aircraft terminal device can connect to a ground cell formed by a horizontally-oriented antenna due to e.g. reflection and, in other cases, a terminal which is not an aircraft terminal device can detect and connect to a vertically-oriented cell (also simply referred to as "vertical cell") formed by a vertically-oriented antenna. In such cases, since a wireless communication resource is not properly allocated to ground-to-ground communication and air-to-ground communication, communication traffic can become large in only one of the both types of communication channels, thereby resulting in occurrence of congestion in communication and a decrease in frequency usage efficiency.

One of known technologies which deal with such problems related to a base station adapted for both air-to-ground communication and ground-to-ground communication is a system configured such that data transmission is performed in a frequency band from 60 GHz to 90 GHz and that a directional beam is formed for performing air-to-ground communication and controlled such that the beam is directed to the position of an aircraft, in particular, such that data transmission is performed exclusively in a range of angles of at least 5 degrees in the upward direction relative to the horizontal plane. (See Patent Document 1)

PRIOR ART DOCUMENT(S)

Patent Document(s)

Patent Document 1: JP2017-523742A

SUMMARY OF THE INVENTION

Task to be Accomplished by the Invention

Like the system of the above-described prior art, a system may be configured to be capable of controlling the direction of a directional beam so as to eliminate the problem that an aircraft terminal device can connect to a ground cell and a terminal which is not an aircraft terminal device can connect to a vertically-oriented cell. However, such a configuration inconveniently needs to acquire information on an aircraft's position and altitude in order to control the direction of a beam. Moreover, when a base station is adapted for both air-to-ground communication and ground-to-ground communication, the base station is desirably configured such that air-to-ground communication can be controlled by following the same control procedure as ground-to-ground communication, thereby eliminating a need to perform complicated communication control during an initial access, a handover, and other actions.

The present invention has been made in view of such problems of the prior art, and a primary object of the present invention is to provide a base station device, a communication system, and a communication control method, which, without a need to acquire and use information on an aircraft's position and altitude, enable proper allocation of a wireless communication resource to ground-to-ground communication and air-to-ground communication, thereby avoiding occurrence of congestion in communication and a decrease in frequency usage efficiency, and further enable air-to-ground communication to be controlled by following the same control procedure as ground-to-ground communication.

Means to Accomplish the Task

A first aspect of the present invention provides a base station device for performing air-to-ground communication with an aircraft terminal device for air-to-ground communication placed in an aircraft and for performing ground-to-ground communication with a ground terminal device placed on a ground location, the base station device comprising: an air-to-ground communication device configured to perform communication with the ground terminal device by using a vertically-oriented antenna adapted for air-to-ground communication; a ground communication device configured to perform communication with the ground terminal device by using a horizontally-oriented antenna adapted for ground-to-ground communication; and controller configured to manage a vertically-oriented cell formed by the vertically-oriented antenna and a ground cell formed by the horizontally-oriented antenna with respective IDs used to identify the vertically-oriented cell and the ground cell, and to control communication with a counterpart terminal device such that, if the counterpart terminal device is an aircraft terminal device, the controller causes the counterpart terminal device to connect to the vertically-oriented cell, otherwise the controller causes the counterpart terminal device to connect to the ground cell.

Another aspect of the present invention provides a communication system comprising a base station device for performing air-to-ground communication with an aircraft terminal device for air-to-ground communication placed in an aircraft and for performing ground-to-ground communication with a ground terminal device placed on a ground location, wherein the base station device comprises: an air-to-ground communication device configured to perform communication with the ground terminal device by using a vertically-oriented antenna adapted for air-to-ground communication; a ground communication device configured to perform communication with the ground terminal device by using a horizontally-oriented antenna adapted for ground-to-ground communication; and a controller configured to manage a vertically-oriented cell formed by the vertically-oriented antenna and a ground cell formed by the horizontally-oriented antenna with respective IDs used to identify the vertically-oriented cell and the ground cell, and to control communication with a counterpart terminal device such that, if the counterpart terminal device is an aircraft terminal device, the controller causes the counterpart terminal device to connect to the vertically-oriented cell, otherwise the controller causes the counterpart terminal device to connect to the ground cell.

Yet another aspect of the present invention provides a communication control method performed by a base station device for controlling communication with an aircraft terminal device for air-to-ground communication placed in an aircraft and a ground terminal device placed on a ground location, with regard to a connection destination thereof, the method comprising managing a vertically-oriented cell formed by a vertically-oriented antenna and a ground cell formed by a horizontally-oriented antenna with respective IDs used to identify the vertically-oriented cell and the ground cell, and controlling communication with a counterpart terminal device in such a manner that, if the counterpart terminal device is an aircraft terminal device, causing the counterpart terminal device to connect to the vertically-oriented cell, otherwise causing the counterpart terminal device to connect to the ground cell.

Effect of the Invention

According to the present invention, without a need to acquire and use information on an aircraft's position and altitude, a wireless communication resource can be properly allocated to ground-to-ground communication and air-to-ground communication, thereby preventing occurrence of congestion in communication and a decrease in frequency usage efficiency. Moreover, air-to-ground communication can be controlled by following the same control procedure as ground-to-ground communication, which eliminates a need to perform complicated communication control during an initial access, a handover, and other actions.

DESCRIPTION OF THE PREFERRED EMBODIMENT(S)

Figure 1:
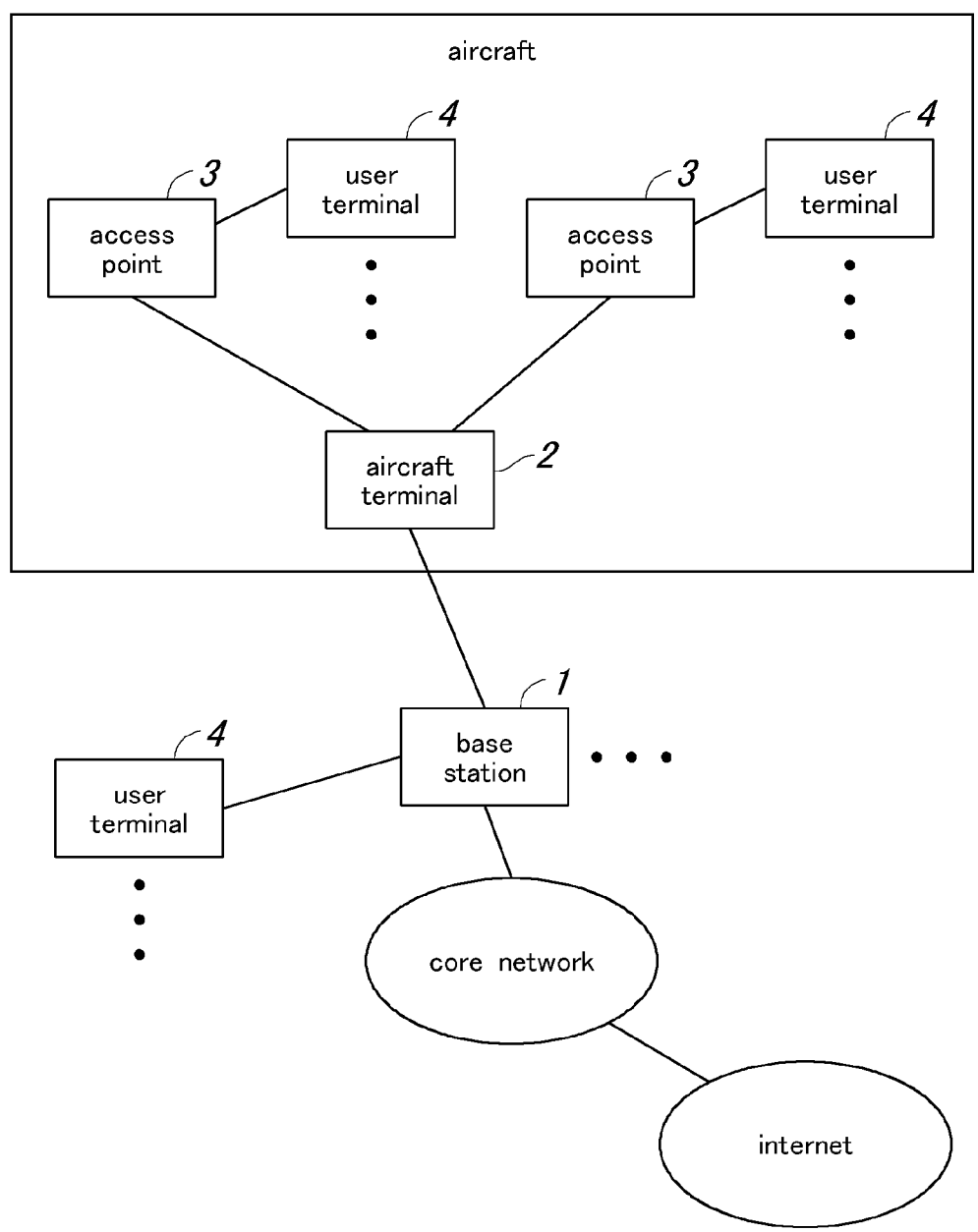
FIG. 1 is a diagram showing a general configuration of a communication system according to a first embodiment of the present invention.

A first aspect of the present invention made to achieve the above-described object is a base station device for performing air-to-ground communication with an aircraft terminal device for air-to-ground communication placed in an aircraft and for performing ground-to-ground communication with a ground terminal device placed on a ground location, the base station device comprising: an air-to-ground communication device configured to perform communication with the ground terminal device by using a vertically-oriented antenna adapted for air-to-ground communication; a ground communication device configured to perform communication with the ground terminal device by using a horizontally-oriented antenna adapted for ground-to-ground communication; and a controller configured to manage a vertically-oriented cell formed by the vertically-oriented antenna and a ground cell formed by the horizontally-oriented antenna with respective IDs used to identify the vertically-oriented cell and the ground cell, and to control communication with a counterpart terminal device such that, if the counterpart terminal device is an aircraft terminal device, the controller causes the counterpart terminal device to connect to the vertically-oriented cell, otherwise the controller causes the counterpart terminal device to connect to the ground cell.

In this configuration, a base station can, without acquiring information on an aircraft's position and altitude, properly allocate a wireless communication resource to ground-to-ground communication and air-to-ground communication, thereby preventing occurrence of congestion in communication and a decrease in frequency usage efficiency. Moreover, the base station can control air-to-ground communication by following the same control procedure as ground-to-ground communication, thereby eliminating a need to perform complicated communication control during an initial access, a handover, and other actions.

A second aspect of the present invention is the base station device of the first aspect, wherein the controller is configured such that, when the ground communication device or the air-to-ground communication device receives a message transmitted from the counterpart terminal device, the controller determines whether the controller determines whether or not the counterpart terminal device is an aircraft terminal device.

In this configuration, the base station can properly determine whether or not a counterpart terminal device is the aircraft terminal device.

A third aspect of the present invention is the base station device of the first aspect, wherein the controller is configured such that, when the counterpart terminal device is an aircraft terminal device, the controller selects the vertically-oriented cell as a connection destination of the counterpart terminal device and transmits a connection instruction message including a cell ID of the vertically-oriented cell from the air-to-ground communication device to the counterpart terminal device.

This configuration ensures that the base station device prevents the aircraft terminal device from connecting the ground cell.

A fourth aspect of the present invention is the base station device of the first aspect, wherein the controller is configured such that, when the counterpart terminal device is not an aircraft terminal device, the controller selects the ground cell as a connection destination of the counterpart terminal device and transmits a connection instruction message including a cell ID of the ground cell from the ground-to-ground communication device to the counterpart terminal device.

This configuration ensures that the base station device prevents the terminal device which is not an aircraft terminal device from connecting the vertically-oriented cell.

A fifth aspect of the present invention is the base station device of the first aspect, further comprising a network communication device configured to receive an emergency alert from an emergency alert delivery device via a core network, wherein the controller is configured such that, when the network communication device receives the emergency alert, the controller prevents the aircraft terminal device as the counterpart terminal device from connecting to the vertically-oriented cell.

This configuration can minimize congestion in a communication channel on the core network side of the base station.

A sixth aspect of the present invention is the base station device of the first aspect, further comprising a network communication device configured to perform communication with a core network, wherein the controller is configured to prevent the aircraft terminal device as the counterpart terminal device from connecting to the vertically-oriented cell depending on volume of communication performed by the network communication device.

This configuration can minimize congestion in a communication channel on the core network side of the base station.

A seventh aspect of the present invention is a communication system comprising a base station device for performing air-to-ground communication with an aircraft terminal device for air-to-ground communication placed in an aircraft and for performing ground-to-ground communication with a ground terminal device placed on a ground location, wherein the base station device comprises: an air-to-ground communication device configured to perform communication with the ground terminal device by using a vertically-oriented antenna adapted for air-to-ground communication; a ground communication device configured to perform communication with the ground terminal device by using a horizontally-oriented antenna adapted for ground-to-ground communication; and a controller configured to manage a vertically-oriented cell formed by the vertically-oriented antenna and a ground cell formed by the horizontally-oriented antenna with respective IDs used to identify the vertically-oriented cell and the ground cell, and to control communication with a counterpart terminal device such that, if the counterpart terminal device is an aircraft terminal device, the controller causes the counterpart terminal device to connect to the vertically-oriented cell, otherwise the controller causes the counterpart terminal device to connect to the ground cell.

In this configuration, as in the first aspect of the present invention, a base station can, without acquiring information on an aircraft's position and altitude, properly allocate a wireless communication resource to ground-to-ground communication and air-to-ground communication, thereby preventing occurrence of congestion in communication and a decrease in frequency usage efficiency. Moreover, the base station can control air-to-ground communication by following the same control procedure as ground-to-ground communication.

An eighth aspect of the present invention is the communication system of the seventh aspect, wherein the base station device comprises a network communication device configured to receive an emergency alert from an emergency alert delivery device via a core network, wherein the controller is configured such that, when the network communication device receives the emergency alert, the controller prevents a or the aircraft terminal device from connecting to the vertically-oriented cell.

This configuration can minimize congestion in a communication channel on the core network side of the base station.

A ninth aspect of the present invention is a communication control method performed by a base station device for controlling communication with an aircraft terminal device for air-to-ground communication placed in an aircraft and a ground terminal device placed on a ground location, with regard to a connection destination thereof, the method comprising: managing a vertically-oriented cell formed by a vertically-oriented antenna and a ground cell formed by a horizontally-oriented antenna with respective IDs used to identify the vertically-oriented cell and the ground cell, and controlling communication with a counterpart terminal device in such a manner that, if the counterpart terminal device is an aircraft terminal device, causing the counterpart terminal device to connect to the vertically-oriented cell, otherwise causing the counterpart terminal device to connect to the ground cell.

In this configuration, as in the first aspect of the present invention, a base station can, without acquiring information on an aircraft's position and altitude, properly allocate a wireless communication resource to ground-to-ground communication and air-to-ground communication, thereby preventing occurrence of congestion in communication and a decrease in frequency usage efficiency. Moreover, the base station can control air-to-ground communication by following the same control procedure as ground-to-ground communication.

A tenth aspect of the present invention is the communication control method of the ninth aspect, wherein, when the base station device receives an emergency alert from an emergency alert delivery device via a core network, communication with the counterpart terminal device is controlled so as to prevent a or the aircraft terminal device from connecting to the vertically-oriented cell.

This configuration can minimize congestion in a communication channel on the core network side of the base station.

Embodiments of the present invention are described in the following with reference to the appended drawings.

First Embodiment

FIG. 1 is a diagram showing a general configuration of a communication system according to a first embodiment of the present invention.

This communication system provides in-flight Internet services to aircraft passengers, and includes a base station 1 placed on a ground location, an aircraft terminal 2 (a terminal for air-to-ground communication placed in an aircraft), access points 3 in the aircraft, and user terminals 4 used by users.

The base station 1 performs air-to-ground communication with the aircraft terminal 2 placed in the aircraft. The base station 1 also performs ground-to-ground communication with user terminals 4 used on the ground. Wireless communication systems such as LTE (Long Term Evolution) are adopted for air-to-ground communication and ground-to-ground communication. The base station 1 is connected to the Internet via a core network (backbone).

The aircraft terminal 2 performs air-to-ground communication with the base station 1 on the ground. The aircraft terminal 2 is connected to the access point 3 via a network.

An access point 3 communicates with user terminals 4 used in the aircraft by a wireless LAN communication method such as Wi-Fi (Registered trademark).

A user terminal 4 may be a smartphone, a tablet terminal, and any other suitable terminal device. In the aircraft, a user terminal 4 connects to the access point 3, and transmits and receives user data to and from a counterpart station such as a distribution server on the Internet via the access point 3, the aircraft terminal 2, the base station 1, and the core network. On the ground, a terminal 4 connects to the base station 1 and transmits and receives user data to and from a counterpart station such as a distribution server on the Internet via the base station 1 and the core network.

The base station 1 controls air-to-ground communication between the base station 1 and the aircraft terminal 2 by following the same control procedure as ground-to-ground communication between the base station 1 and a user terminal 4 on the ground, where the control procedure is common to all cellular communication methods such as LTE.

In the base station 1, the frequencies used for air-to-ground communication and ground-to-ground communication are not limited to particular frequency bands. However, since user terminals 4 generally performs cellular communications by using a UHF band, when the base station 1 performs air-to-ground communication and ground-to-ground communication by using a VHF band, the user terminals 4 cannot directly communicate with the base station 1. In this case, a relay device (such as a wireless LAN access point) may be provided for supporting communication using a VHF band so that the user terminals 4 can communicate with the base station 1 via the relay device.

Figure 2:
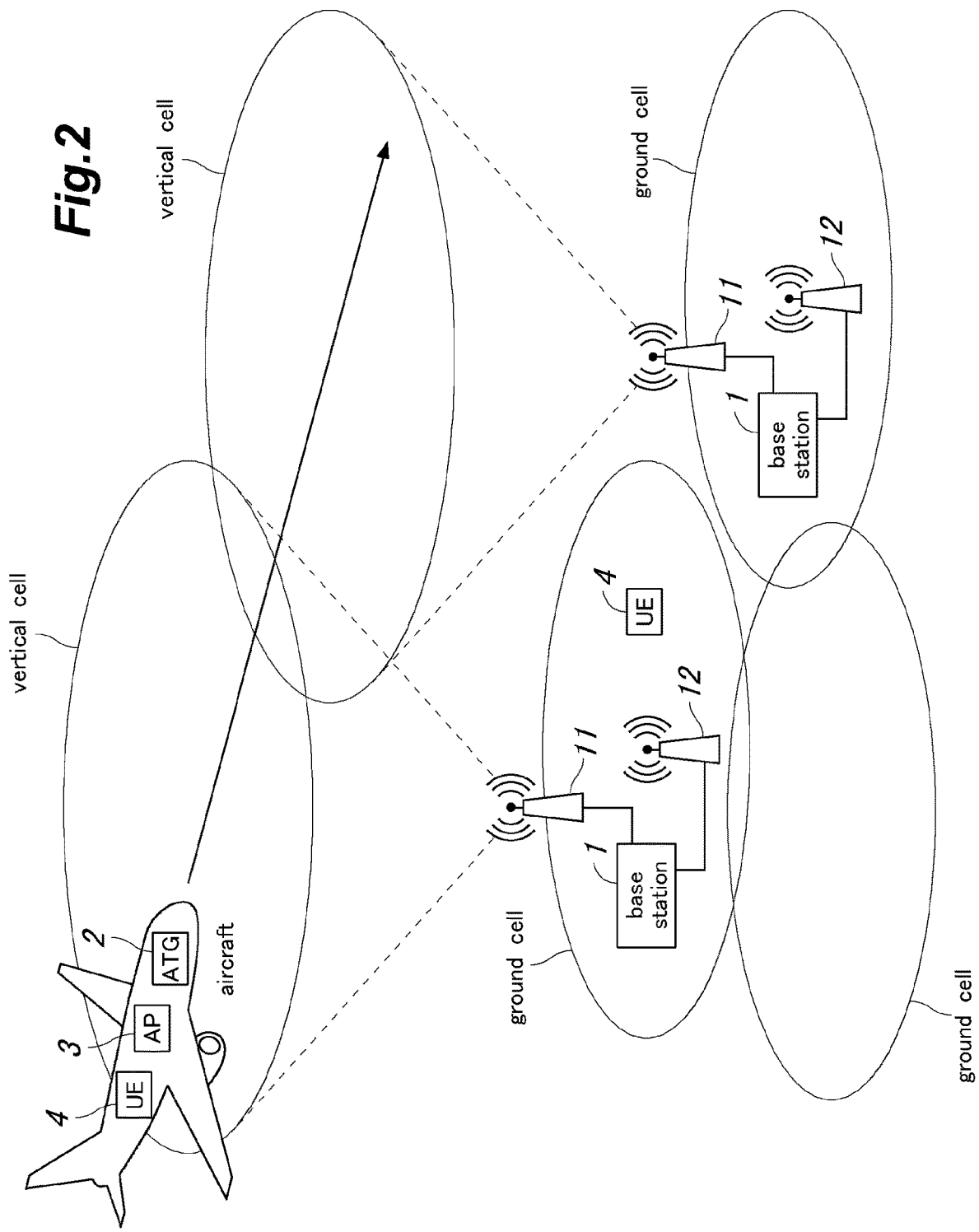
FIG. 2 is an explanatory view showing an outline of the communication system according to the first embodiment of the present invention.

Next, an outline of the communication system according to the first embodiment of the present invention will be described. FIG. 2 is an explanatory view showing an outline of the communication system.

The base station 1 has a vertically-oriented antenna 11 adapted for air-to-ground communication, and a horizontally-oriented antenna adapted for ground-to-ground communication. The vertically-oriented antenna 11 forms a vertically-oriented cell (also simply referred to as "vertical cell") for air-to-ground communication and the horizontally-oriented antenna 12 forms a ground cell for ground-to-ground communication. The aircraft terminal 2 placed in the aircraft connects to the vertical cell, and user terminals 4 used on the ground connects to the ground cell.

Multiple base stations 1 are placed on the ground at necessary intervals. As the aircraft moves, the aircraft terminal 2 placed in the aircraft performs a handover; that is, switches its connection destination form one vertical cell to another. Some ground base stations (not shown) equipped with only horizontally-oriented antennas and adapted only for ground-to-ground communication are also provided. Such a ground base station forms only a ground cell, and as a user terminal 4 on the ground moves, the user terminal 4 performs a handover; that is, switches its connection destination form one ground cell to another.

In some cases, an aircraft terminal 2 connects to a ground cell due to e.g. reflection. In other cases, a terminal which is not an aircraft terminal can detect and connect to a vertical cell. In such cases, since a wireless communication resource is not properly allocated to ground-to-ground communication and air-to-ground communication, communication traffic can become large in only one of the both types of communication channels, thereby resulting in occurrence of congestion in communication and a decrease in frequency usage efficiency.

In this view, in the present embodiment, vertical cells and ground cells are configured to have respective cell IDs (cell identifiers), which are distinguishable from each other. Moreover, the base station 1 is configured to control communication such that, after detecting cells by cell search operations performed by an aircraft terminal 2 and a user terminal 4, the base station determines whether each of the detected cells is a vertical cell or a ground cell based on their cell IDs, and allocates a detected vertical cell and a detected ground cell to the aircraft terminal and the user terminal 4, respectively.

A cell ID is what is called PCI (Physical Cell Identifier). For example, a cell ID of a type such as "00" or "01" is assigned to a ground cell, and a cell ID of another type such as "90" or "91" is assigned to a vertical cell.

Figure 3:
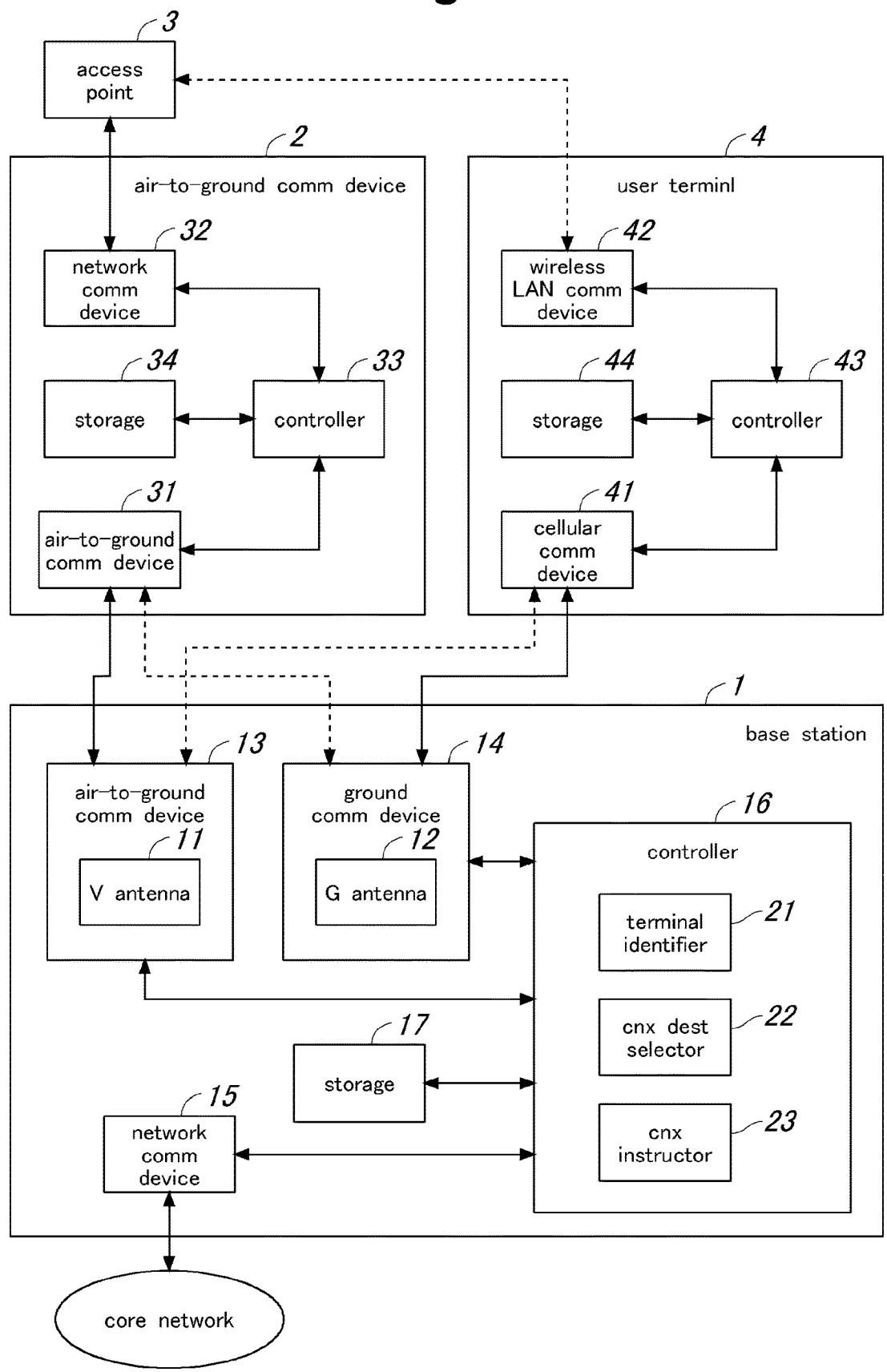
FIG. 3 is a block diagram showing schematic configurations of a base station 1, an aircraft terminal 2 (a terminal adapted for air-to-ground communication), and a user terminal 4 according to the first embodiment of the present invention.

Next, schematic configurations of a base station 1, an aircraft terminal 2, and a user terminal 4 according to the first embodiment will be described. FIG. 3 is a block diagram showing schematic configurations of a base station 1, an aircraft terminal 2 adapted for air-to-ground communication, and a user terminal 4.

The aircraft terminal 2 includes an air-to-ground communication device 31, a network communication device 32, a controller 33, and a storage 34.

The air-to-ground communication device 31 communicates with the base station 1 by a wireless communication method such as LTE.

The network communication device 32 communicates with the access point 3 connected to the network.

The storage 34 stores a terminal ID of the aircraft terminal 2, programs executable by a processor to implement the controller 33, and other information. A terminal ID is a user ID stored in a SIM card (Subscriber Identity Module Card). More specifically, a terminal ID is an IMSI (International Mobile Subscriber Identity).

The controller 33 is implemented by a processor, and configured to cause the processor to execute programs stored in the storage 34 in order to perform a cell search operation for searching for one or more cells connectable to the aircraft terminal, a cell connection operation for connecting to the cell to which the base station has instructed to connect, or other operations.

The user terminal 4 includes a cellular communication device 41, a wireless LAN communication device 42, a controller 43, and a storage 44.

The cellular communication device 41 is configured such that, when the user terminal 4 is located on the ground, the cellular communication device 41 communicates with the base station 1 by using a wireless communication method such as LTE.

The wireless LAN communication device 42 is configured such that, when the user terminal 4 is placed in an aircraft or when the wireless LAN function of the user terminal is set to be active, the wireless LAN communication device 42 communicates with an access point 3 by using a wireless LAN communication method.

The storage 44 stores a terminal ID of the user terminal 4, programs to be executed by the processor, which implements the controller 43, and other information. It should be noted that each terminal ID is a user ID (IMSI) stored in the SIM card.

The controller 43 is implemented by a processor, and configured to cause the processor to execute programs stored in the storage 44 in order to perform a cell search operation for searching for one or more cells connectable to the user terminal, a cell connection operation for connecting to the cell to which the base station has instructed to connect, or other operations.

The base station 1 includes an air-to-ground communication device 13, a ground communication device 14, a network communication device 15, a controller 16, and a storage 17.

The air-to-ground communication device 13 includes a vertically-oriented antenna 11 adapted for air-to-ground communication, and is configured to communicate with an aircraft terminal 2 by using a wireless communication method such as LTE.

The ground communication device 14 includes a horizontally-oriented antenna 12 adapted for ground-to-ground communication, and is configured to communicate with user terminals 4 by using a wireless communication method such as LTE.

The storage 17 stores terminal management information relating to terminal IDs of aircraft terminals 2, cell management information relating to cell IDs of vertical cells and ground cells, and programs to be executed by a processor, which implements the controller 16. The terminal management information is used by a terminal identifier 21 of the controller 16 to identify aircraft terminals 2. The cell management information is used by a connection destination selector 22 of the controller 16 to identify vertical cells and ground cells.

The controller 16 includes the terminal identifier 21, the connection destination selector 22, and a connection instructor 23. The controller 16 is implemented by the processor, and each unit of the controller 16 is implemented by a corresponding program stored in the storage 17 executed by the processor.

The terminal identifier 21 determines whether or not the transmission source of a message is an aircraft terminal 2 based on prescribed information (terminal ID, in this case), the prescribed information being included in a message received from the aircraft terminal 2 and user terminals 4 via the air-to-ground communication device 13 and the ground communication device 14. The terminal identifier 21 may be configured to determine whether or not the transmission source of a message is an aircraft terminal 2, instead of using terminal IDs, based on whether or not the message contains prescribed information for requesting a prescribed air-to-ground communication.

The connection destination selector 22 selects either of a vertical cell or a ground cell as a connection destination based on a result of the determination of the terminal identifier 21, that is, based on whether or not the transmission source of a message is an aircraft terminal 2. Specifically, when the transmission source of a message is determined to be an aircraft terminal 2, the connection destination selector 22 selects a vertical cell as a connection destination from connection destination candidate cells whose cell IDs are included in the message received from the aircraft terminal 2. When the transmission source of a message is determined not to be an aircraft terminal 2, that is, when the transmission source of a message is determined to be a user terminal 4 on the ground, the connection destination selector 22 selects a ground cell from connection destination candidate cells whose cell IDs are included in the message from the user terminal 4.

The connection instructor 23 causes the air-to-ground communication device 13 to transmit a connection instruction message to an aircraft terminal 2, or causes the ground communication device 14 to transmit a connection instruction message to a user terminal 4, where the connection instruction message instructs the aircraft terminal 2 or the user terminal 4 to connect to the cell selected by the connection destination selector 22 (a vertical cell or a ground cell, respectively).

Figure 4:
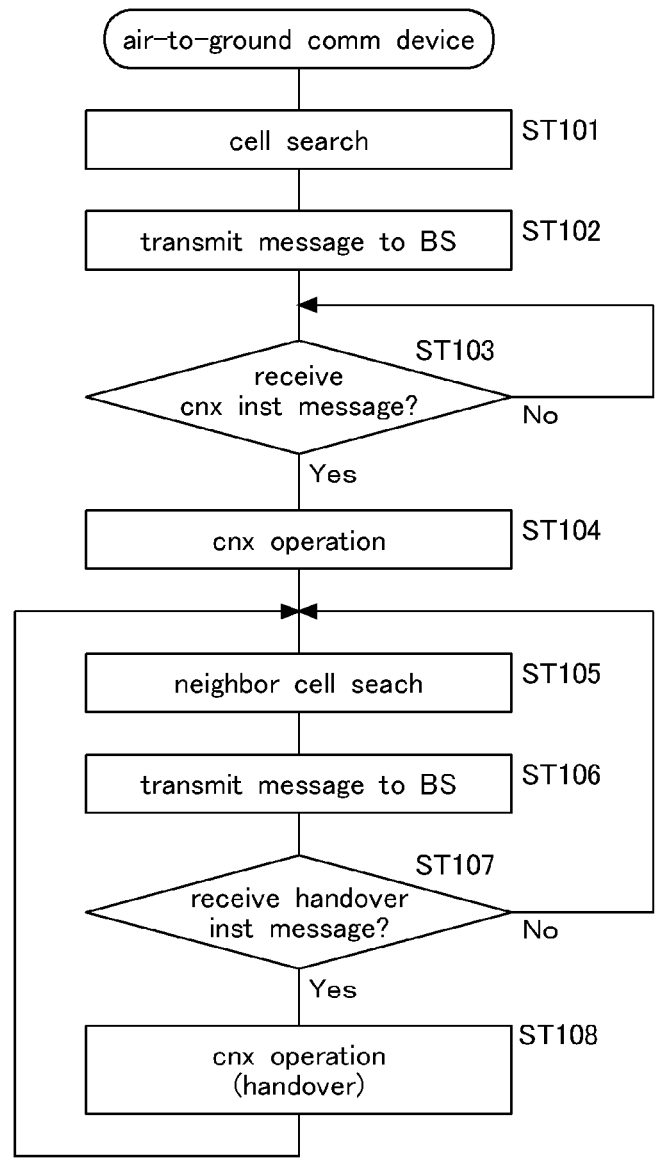
FIG. 4 is a flowchart showing an operation procedure of operations performed by an aircraft terminal 2 according to the first embodiment of the present invention.

Next, an operation procedure of operations performed by an aircraft terminal 2 according to the first embodiment of the present invention will be described. FIG. 4 is a flowchart showing an operation procedure of operations performed by an aircraft terminal 2.

First, in the aircraft terminal 2, which is not connected to a cell, the controller 33 performs a cell search operation for searching for one or more cells connectable to the aircraft terminal 2 (ST101). Then, the air-to-ground communication device 31 transmits to a base station 1 a message including cell IDs of the cells (connection destination candidates) detected by the cell search operation and the terminal ID of the aircraft terminal (ST102).

Next, if the air-to-ground communication device 31 receives a connection instruction message transmitted from the base station 1 (Yes in ST103), the controller 33 causes the air-to-ground communication device 31 to connect to the vertical cell designated in the message as a connection destination (ST104).

Next, while the aircraft terminal 2 connects to the cell, the controller 33 performs a neighbor cell search operation for searching for one or more connectable cells other than the cell to which the aircraft terminal currently connects (ST105). Then, the air-to-ground communication device 31 transmits to the base station 1 a message including cell IDs of the cells (connection destination candidates) detected by the neighbor cell search operation and the terminal ID of the aircraft terminal 2 (ST106).

Next, if the air-to-ground communication device 31 receives a handover instruction message transmitted from the base station 1 (Yes in ST107), the controller 33 causes the air-to-ground communication device 31 to perform a connection to a vertical cell (a handover) designated by the handover instruction message as a connection destination (handover destination) (ST108).

An operation procedure of operations performed by a user terminal 4 on a ground location is the same as that of the aircraft terminal 2 shown in FIG. 4 except that a connection destination of the user terminal 4 is a ground cell in place of a vertical cell.

Figure 5:
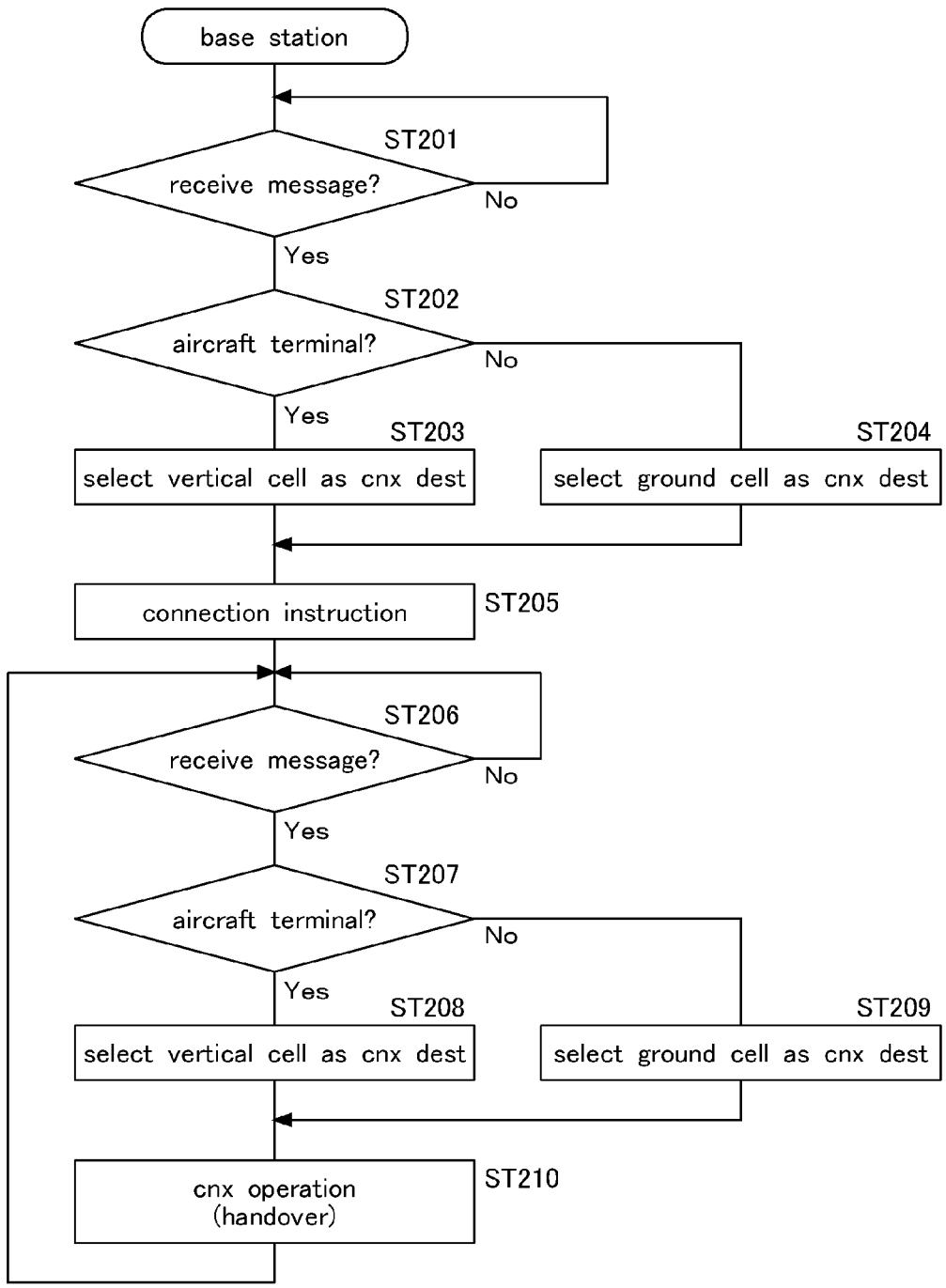
FIG. 5 is a flowchart showing an operation procedure of operations performed by a base station 1 according to the first embodiment of the present invention.

Next, an operation procedure of operations performed by a base station 1 according to the first embodiment of the present invention will be described. FIG. 5 is a flowchart showing an operation procedure of operations performed by a base station 1.

First, in the base station 1, if the air-to-ground communication device 13 or the ground communication device 14 receives a message transmitted from an aircraft terminal 2 or a user terminal 4 to which the base station does not currently connect (Yes in ST201), the terminal identifier 21 determines whether or not the transmission source of the message is an aircraft terminal 2 based on the terminal ID included in the received message (ST202).

If the transmission source of the message is an aircraft terminal 2 (Yes in ST202), the connection destination selector 22 selects a vertical cell as a connection destination from connection destination candidate cells whose cell IDs are included in the message (ST203). Then, the connection instructor 23 causes the air-to-ground communication device 13 to transmit a connection instruction message to the aircraft terminal 2, where the connection instruction message instructs the aircraft terminal 2 to connect to the selected vertical cell as a connection destination (ST205).

If the transmission source of the message is not an aircraft terminal 2; that is, a user terminal 4 on the ground (No in ST202), the connection destination selector 22 selects a ground cell as a connection destination from connection destination candidate cells whose cell IDs are included in the message (ST204). Then, the connection instructor 23 causes the ground communication device 14 to transmit a connection instruction message to the user terminal 4 on the ground, where the connection instruction message instructs the user terminal 4 to connect to the selected ground cell as a connection destination (ST205).

Next, if the air-to-ground communication device 13 or the ground communication device 14 receives a message transmitted from an aircraft terminal 2 or a user terminal 4 to which the base station currently connects (Yes in ST206), the terminal identifier 21 determines whether or not the transmission source of the message is an aircraft terminal 2 based on the terminal ID included in the received message (ST202).

If the transmission source of the message is an aircraft terminal 2 (Yes in ST207), the connection destination selector 22 selects a vertical cell as a connection destination from connection destination candidate cells whose cell IDs are included in the message (ST208). Then, the connection instructor 23 causes the air-to-ground communication device 13 to transmit a connection instruction message to the aircraft terminal 2, where the connection instruction message instructs the aircraft terminal 2 to connect (perform a handover) to the selected vertical cell as a connection destination (ST210).

If the transmission source of the message is not an aircraft terminal 2; that is, a user terminal 4 on the ground (No in ST207), the connection destination selector 22 selects a ground cell as a connection destination from connection destination candidate cells whose cell IDs are included in the message (ST209). Then, the connection instructor 23 causes the ground communication device 14 to transmit a connection instruction message to the user terminal 4 on the ground, where the connection instruction message instructs the user terminal 4 to connect (perform a handover) to the selected ground cell as a connection destination (ST210).

In this way, the configuration according to the present embodiment can ensure that an aircraft terminal 2 placed in an aircraft connects to a vertical cell and a user terminal 4 placed on a ground location connects to a ground cell. As a result, the configuration can solve the problem that an aircraft terminal 2 can connect to a ground cell despite a vertical cell that is connectable to the aircraft terminal 2 or an a user terminal 4 on the ground can connect to a vertical cell despite a ground cell that is connectable to the user terminal 4, resulting in occurrence of congestion in communication and a decrease in frequency usage efficiency. Moreover, since the configuration manages vertical cells and ground cells with respective IDs used to identify the vertical cells and the ground cells, air-to-ground communication can be controlled by following the same control procedure as ground-to-ground communication, which eliminates a need to perform complicated communication control during an initial access, a handover, and other actions.

In the present embodiment, an example in which an aircraft terminal 2 is placed in an aircraft has been described. However, an aircraft terminal 2 may be placed in any flying object such as a helicopter.

In the present embodiment, a transmission source terminal adds an IMSI as a terminal ID to a message and transmits the message to a base station 1, and, upon receiving the message, the base station 1 determines whether or not the transmission source is an aircraft terminal 2 based on the IMSI included in the message, which enables air-to-ground communication to be controlled by following the same control procedure as ground-to-ground communication. However, terminal IDs used to identify terminals are not limited to IMSIs, and examples of terminals IDs include IMEIs (International Mobile Equipment Identity) assigned to each terminal body.

Second Embodiment

Figure 6:
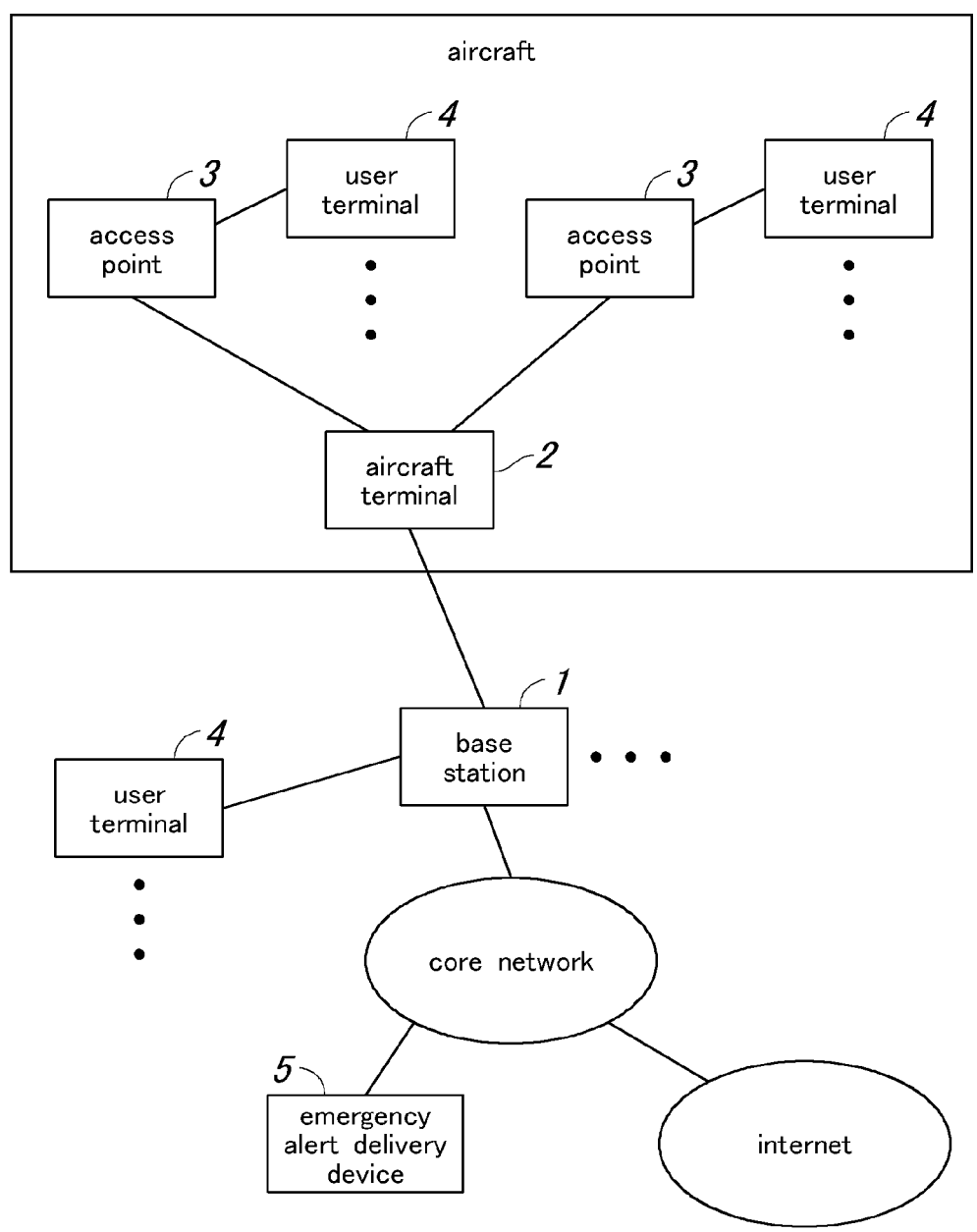
FIG. 6 is a diagram showing a general configuration of a communication system according to a second embodiment of the present invention.

Next, a second embodiment of the present invention will be described. Except for what will be discussed here, this embodiment is the same as the above-described embodiment. FIG. 6 is a diagram showing a general configuration of a communication system according to the second embodiment of the present invention.

When a disaster such as an earthquake occurs and an emergency alert is issued, the volume of communication performed by user terminals 4 on the ground can increase quickly during a short period of time because of large amounts of rescue request, collection of disaster information, and safety confirmation. Thus, in the present embodiment, a base station is configured to prioritize ground-to-ground communication performed by user terminals 4 through ground cells, thereby preventing aircraft terminals from performing air-to-ground communication through vertical cells. This configuration can minimize congestion in a communication channel on the core network side of a base station 1, thereby reducing failures in disaster-related communication such as communication for rescue request. In this case, a user terminal 4 placed in an aircraft becomes unable to communicate with a base station because of prevention of air-to-ground communication. However, this will not cause any serious problem because the inability of communication continues only temporarily while the aircraft is flying over an area to which an emergency alert is issued.

Specifically, an emergency alert delivery device 5 delivers an emergency alert through a core network to base stations 1 located within a target area to which the emergency alert is issued. Upon receiving an emergency alert, a base station 1 controls communication such that, when an aircraft terminal 2 connects to a vertical cell, the base station disconnect the air-to-ground communication, and when no aircraft terminal 2 connects to the vertical cell, the base station prevents any aircraft terminal 2 from connecting to the vertical cell.

Next, operation procedures of operations performed by a base station 1 according to the second embodiment of the present invention will be described with reference to FIGS. 7 and 8. An operation procedure of operations performed by an aircraft terminal 2 according to the second embodiment is the same as that shown in FIG. 4.

Figure 7:
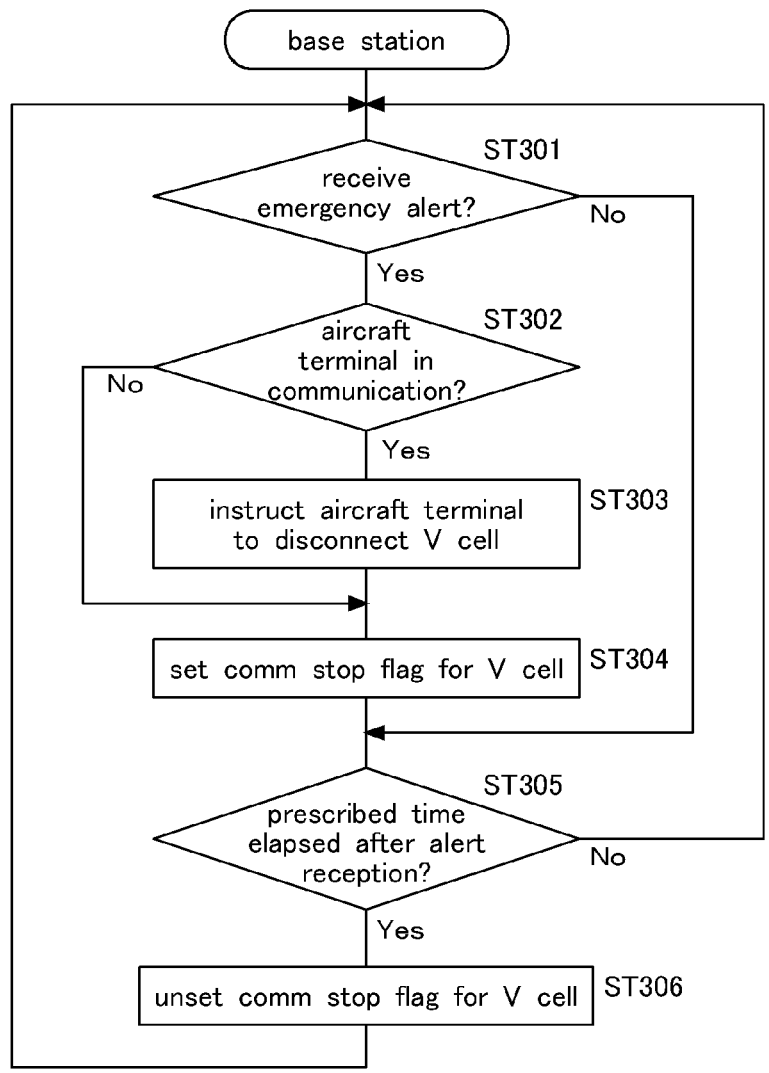
FIG. 7 is a flowchart showing an operation procedure of operations performed by a base station 1 when the base station 1 receives an emergency alert according to the second embodiment of the present invention.
Figure 8:
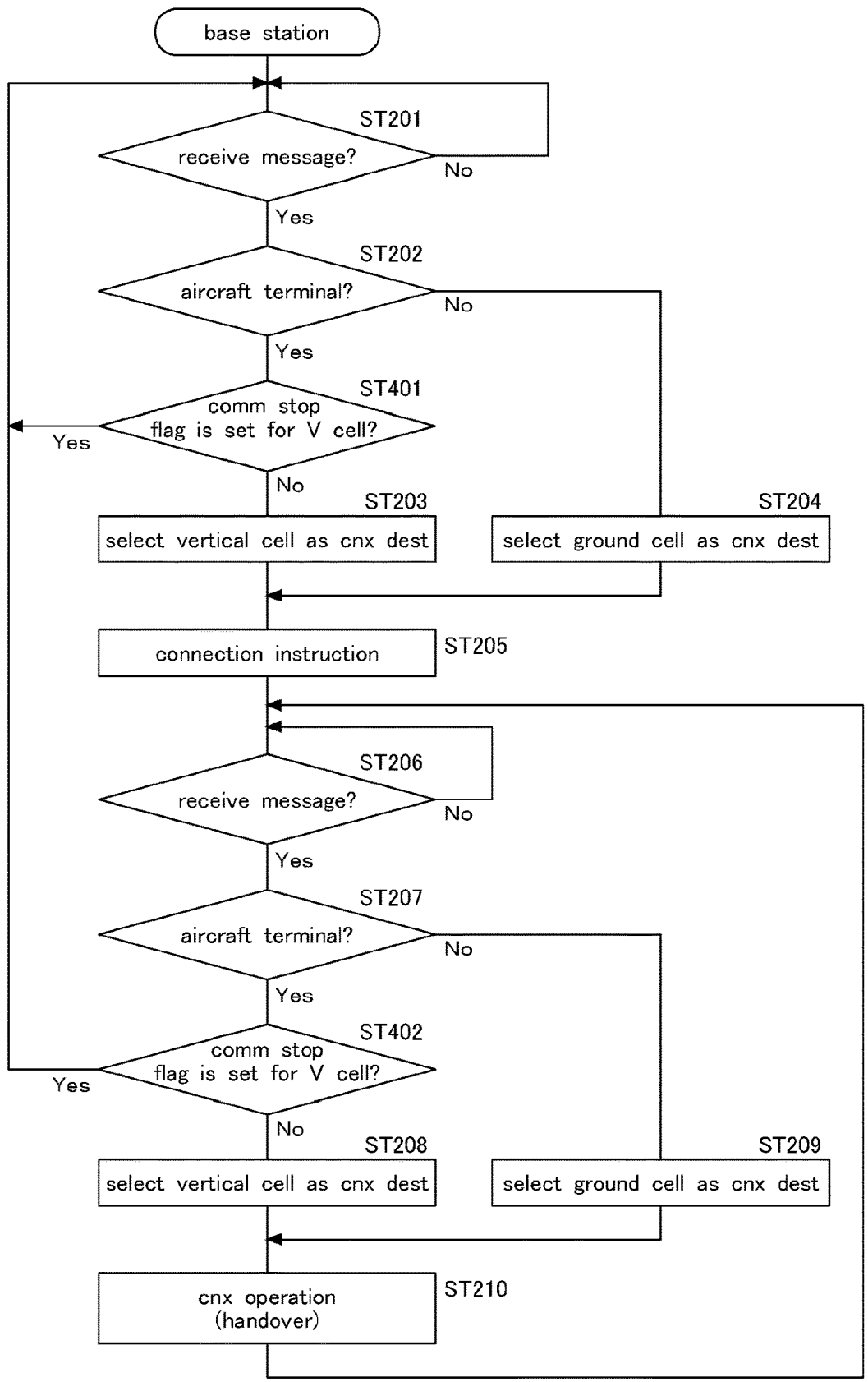
FIG. 8 is a flowchart showing an operation procedure of operations performed by the base station 1 when the base station 1 receives a message according to the second embodiment of the present invention.

FIG. 7 is a flowchart showing an operation procedure of operations performed by a base station 1 when the base station 1 receives an emergency alert. FIG. 8 is a flowchart showing an operation procedure of operations performed by a base station 1 when the base station 1 receives a message. In FIG. 8, the same processing steps as those in FIG. 5 are denoted by the same numeral references as in FIG. 5, and the description thereof will not be repeated. It should be noted that the operation procedures of FIGS. 7 and 8 are simultaneously performed by a base station 1 in parallel.

First, an operation procedure of operations performed by a base station 1 when the base station 1 receives an emergency alert will be described. In FIG. 7, the base station 1 first determines whether or not the base station receives an emergency alert (ST301). If the base station 1 does not receive an emergency alert (No in ST301), the process proceeds to ST305.

If the base station 1 receives an emergency alert (Yes in ST301), the base station 1 then determines whether or not an aircraft terminal 2 currently connects to a vertical cell thereof (ST302). If an aircraft terminal 2 currently connects to the vertical cell (Yes in ST302), the base station 1 transmits to the aircraft terminal 2 a disconnect instruction message to instruct the aircraft terminal 2 to disconnect the vertical cell (ST303). After the transmission of the disconnect instruction message, or when any aircraft terminal 2 does not currently connect to the vertical cell (No in ST302), the base station 1 sets a communication stop flag for the vertical cell (ST304).

Next, after determining whether or not the base station has received an emergency alert in ST301, the base station 1 determines whether or not a prescribed time has elapsed (ST305). If the prescribed time has not elapsed (No in ST305), the process returns to ST301, and the base station repeats the subsequent processing steps. If the prescribed time has elapsed (Yes in ST305), the base station unsets the communication stop flag for the vertical cell (ST306), and the process returns to ST301.

In the present embodiment, a base station is configured such that, even if the base station has not received an emergency alert in ST301, the base station unsets the communication stop flag for the vertical cell after the prescribed time has elapsed. However, a base station may be configured such that, before receiving an emergency alert, the base station does nothing and waits for such an alert.

Next, an operation procedure of operations performed by the base station 1 when the base station 1 receives a message will be described. In FIG. 8, after determining whether or not the source of a message is an aircraft terminal 2 in ST202 and ST207, the base station 1 determines whether or not a communication stop flag is set for a vertical cell (ST401, ST402). If the communication stop flag is set for the vertical cell (Yes in ST401, Yes in ST402), the process returns to ST201 without transmitting a connection instruction message to the aircraft terminal 2. This configuration prevents an aircraft terminal 2 from connecting to the base station 1 while the communication stop flag is set for a vertical cell, thereby minimizing congestion in a communication channel on the core network side of the base station.

Examples of an emergency alert include emergency alerts issued by the Earthquake Tsunami Warning System (ETWS), the National Instant Alert System (J Alert), and other disaster warning systems.

A base station 1 may be configured such that, not only when the base station 1 receives an emergency alert, but also when the controller 16 in the base station 1 detects occurrence of congestion in a communication channel on the core network side (i.e. an increase in volume of communication by the network communication device), the base station sets a stop flag for a vertical cell to prevent aircraft terminals 2 from performing air-to-ground communication through the vertical cell, thereby prioritizing ground-to-ground communication performed by user terminals 4 through a ground cell.

A base station 1 may be configured such that, when receiving an emergency alert or when detecting occurrence of congestion in a communication channel, the base station stops data transmission from a vertically-oriented antenna 11 so as not to form a vertical cell, and after a prescribed time has lapsed, the base station restarts data transmission from the vertically-oriented antenna 11.

While specific embodiments of the present invention are described herein for illustrative purposes, the present invention is not limited to those specific embodiments. It will be understood that various changes, substitutions, additions, and omissions may be made for elements of the embodiments without departing from the scope of the invention. In addition, elements and features of the different embodiments may be combined with each other as appropriate to yield a new embodiment which is within the scope of the present invention.

INDUSTRIAL APPLICABILITY

A base station device, a communication system, and a communication control method according to the present invention provide effective solutions which, without a need to acquire and use information on an aircraft's position and altitude, enable proper allocation of a wireless communication resource to ground-to-ground communication and air-to-ground communication, thereby avoiding occurrence of congestion in communication and a decrease in frequency usage efficiency, and further enable air-to-ground communication to be controlled by following the same control procedure as ground-to-ground communication, and are useful as a base station device for performing air-to-ground communication with an aircraft terminal device placed in an aircraft and for performing ground-to-ground communication with a ground terminal placed on a ground location, a communication system comprising a base station device for performing air-to-ground communication with an aircraft terminal device placed in an aircraft and for performing ground-to-ground communication with a ground terminal placed on a ground location, and a communication control method performed by a base station device for controlling communication with an aircraft terminal device placed in an aircraft and a ground terminal device placed on a ground location, with regard to a connection destination thereof.

Glossary

1 base station
2 aircraft terminal for air-to-ground communication
3 access point
4 user terminal
11 vertically-oriented antenna
12 horizontally-oriented antenna
13 air-to-ground communication device
14 ground communication device
15 network communication device
16 controller
17 storage
31 air-to-ground communication device
32 network communication device
33 controller
34 storage
41 cellular communication device 42 wireless LAN communication device
43 controller
44 storage

The invention claimed is:

1. A base station device for performing air-to-ground communication with an aircraft terminal device for air-to-ground communication placed in an aircraft and for performing ground-to-ground communication with a ground computer terminal placed on a ground location, the base station device comprising:
 a plurality of antennas, the plurality of antennas includes:
  a vertically-oriented antenna configured to perform air to ground communication with the aircraft terminal device, and
  a horizontally-oriented antenna configured to perform ground-to-ground communication with the ground computer terminal; and
 a processor configured
  to manage a vertically-oriented cell formed by the vertically-oriented antenna and a ground cell formed by the horizontally-oriented antenna with respective IDs used to identify the vertically-oriented cell and the ground cell, and
  to control communication such that the aircraft terminal device connects to the vertically-oriented cell, and the ground computer terminal connects to the ground cell,
 wherein the processor is configured such that, when at least one of the plurality of antennas receives a message, the processor determines whether the message is transmitted from the aircraft terminal device or the ground computer terminal based on prescribed information included the message,
 wherein the base station device is further configured to receive an emergency alert from an emergency alert delivery device via a core network, the emergency alert is alerted in response to an occurrence of a disaster,
 wherein the processor is configured such that, when the base station device receives the emergency alert and the message is determined to be transmitted from the aircraft terminal, the processor disconnects the aircraft terminal device from the vertically-oriented cell, and
 wherein the processor is configured such that, when the base station device receives the emergency alert and the message is determined to be transmitted from the ground computer terminal, the processor prevents the aircraft terminal device from connecting to the vertically-oriented cell while the emergency alert is active.

2. The base station device according to claim 1, wherein the processor is configured such that, when the message is determined to be sent by the aircraft terminal device, the processor selects the vertically-oriented cell as a connection destination of the aircraft terminal device and transmits a connection instruction message including a cell ID of the vertically-oriented cell from the vertically-oriented antenna to the aircraft terminal device.

3. The base station device according to claim 1, wherein the processor is configured such that, when the message is determined to be sent by the ground computer terminal, the processor selects the ground cell as a connection destination of the ground computer terminal and transmits a connection instruction message including a cell ID of the ground cell from the horizontal-oriented antenna to the ground computer terminal.

4. The base station device according to claim 1, wherein the processor is configured to prevent the aircraft terminal device from connecting to the vertically-oriented cell when a volume of communication performed by the base station device is above a predetermined value.

5. A communication system comprising:
 a base station device configured to perform air-to-ground communication with an aircraft terminal device for air-to-ground communication placed in an aircraft and perform ground-to-ground communication with a ground computer terminal placed on a ground location,
 wherein the base station device comprises:
 a plurality of antennas, the plurality of antennas includes:
  a vertically-oriented antenna configured to perform air to ground communication with the aircraft terminal device, and
  a horizontally-oriented antenna configured to perform ground-to-ground communication with the ground computer terminal; and
 a processor configured
  to manage a vertically-oriented cell formed by the vertically-oriented antenna and a ground cell formed by the horizontally-oriented antenna with respective IDs used to identify the vertically-oriented cell and the ground cell, and
  to control communication such that the aircraft terminal device connects to the vertically-oriented cell, and the ground computer terminal connects to the ground cell,
 wherein the processor is configured such that, when at least one of the plurality of antennas receives a message, the processor determines whether the message is transmitted from the aircraft terminal device or the ground computer terminal based on prescribed information included the message,
 wherein the base station device is further configured to receive an emergency alert from an emergency alert delivery device via a core network, the emergency alert is alerted in response to an occurrence of a disaster,
 wherein the processor is configured such that, when the base station device receives the emergency alert and the message is determined to be transmitted from the aircraft terminal, the processor disconnects the aircraft terminal device from the vertically-oriented cell, and
 wherein the processor is configured such that, when the base station device receives the emergency alert and the message is determined to be transmitted from the ground computer terminal, the processor prevents the aircraft terminal device from connecting to the vertically-oriented cell while the emergency alert is active.

6. A communication control method performed by a base station device for controlling communication with an aircraft terminal device for air-to-ground communication placed in an aircraft and a ground computer terminal placed on a ground location, with regard to a connection destination thereof, the method comprising:
 managing a vertically-oriented cell formed by a vertically-oriented antenna and a ground cell formed by a horizontally-oriented antenna with respective IDs used to identify the vertically-oriented cell and the ground cell, and
 controlling communication of the base station device such that the aircraft terminal device is caused to connect to the vertically-oriented cell, and the ground computer terminal is caused to connect to the ground cell,
 wherein, when at least one of the antennas receives a message, the base station device determines whether the message is transmitted from the aircraft terminal device or the ground computer terminal based on prescribed information included the message, wherein the base station device receives an emergency alert from an emergency alert delivery device via a core network, the emergency alert is alerted in response to an occurrence of a disaster, wherein, when the base station device receives the emergency alert and the message is determined to be transmitted from the aircraft terminal, the processor disconnects the aircraft terminal device from the vertically-oriented cell, and wherein, when the base station device receives the emergency alert and the message is determined to be transmitted from the ground computer terminal, the processor prevents the aircraft terminal device from connecting to the vertically-oriented cell while the emergency alert is active.

* * * * *